(12) United States Patent
Poivert-Becq

(10) Patent No.: US 8,499,076 B2
(45) Date of Patent: Jul. 30, 2013

(54) METHOD FOR MEASURING THE PERFORMANCE OF AN IP NETWORK AND ASSOCIATED SYSTEM

(75) Inventor: Frédérique Poivert-Becq, Vieillevigne (FR)

(73) Assignee: Centre National d'Etudes Spatiales (FR)

( * ) Notice: Subject to any disclaimer, the term of this patent is extended or adjusted under 35 U.S.C. 154(b) by 250 days.

(21) Appl. No.: 13/130,784

(22) PCT Filed: Nov. 24, 2009

(86) PCT No.: PCT/FR2009/052278
§ 371 (c)(1),
(2), (4) Date: Jul. 7, 2011

(87) PCT Pub. No.: WO2010/058143
PCT Pub. Date: May 27, 2010

(65) Prior Publication Data
US 2011/0264799 A1    Oct. 27, 2011

(30) Foreign Application Priority Data
Nov. 24, 2008  (FR) ...................................... 08 57947

(51) Int. Cl.
*G06F 15/16* (2006.01)
*G06F 12/00* (2006.01)

(52) U.S. Cl.
USPC ....................................................... 709/224

(58) Field of Classification Search
USPC .................. 709/223–229, 203, 250
See application file for complete search history.

(56) References Cited

U.S. PATENT DOCUMENTS

| | | | |
|---|---|---|---|
| 2007/0115847 A1* | 5/2007 | Strutt et al. | 370/252 |
| 2007/0177848 A1* | 8/2007 | Ando et al. | 386/95 |
| 2008/0216148 A1* | 9/2008 | Bienek et al. | 726/1 |
| 2008/0239967 A1 | 10/2008 | Ikeda | |
| 2009/0300632 A1* | 12/2009 | Falcon et al. | 718/103 |
| 2010/0138470 A1* | 6/2010 | McCoy | 709/201 |
| 2011/0126244 A1* | 5/2011 | Hasek | 725/87 |

FOREIGN PATENT DOCUMENTS
WO    2008/121062    10/2008

OTHER PUBLICATIONS

Int'l Search Report & Written Opinion issued in PCT/FR2009/052278 (2010).

* cited by examiner

*Primary Examiner* — Zarni Maung
(74) *Attorney, Agent, or Firm* — Barnes & Thornburg LLP

(57) ABSTRACT

The invention relates to a method for measuring the performance of a network (18). The method includes steps comprising:
parameterizing requests pointing to resources that can be accessed from a computer connected to the network, the parameterized requests being stored in a database;
creating a user session comprising grouping together various stored requests;
running a test campaign comprising concatenating in time the emission of the various requests in a session, each request being emitted by a user terminal connected to the network;
for each one of the emitted requests, waiting for a response and calculating the value of at least one typical variable of the received response; and,
aggregating the various values of the typical variable calculated during the test campaign to determine the value of a network performance estimator.

11 Claims, 3 Drawing Sheets

METHOD FOR MEASURING THE PERFORMANCE OF AN IP NETWORK AND ASSOCIATED SYSTEM

CROSS REFERENCE TO RELATED APPLICATIONS

This patent application is a U.S. nationalization under 35 USC §371 of International Application No. PCT/FR2009/052278, filed Nov. 24, 2009, which claims priority to French Patent Application No. FR0857947, filed Nov. 224, 2008. The disclosures set forth in the referenced applications are incorporated herein by reference in their entireties.

The invention is related to the field of communication networks supporting the IP ("Internet Protocol") protocol. More particularly, the invention concerns a method for measuring the performance of an existing IP communication network.

An IP communication network is made up of nodes and links connecting the nodes. In the case of a composite network, the links have different physical media. The network can for example have a short-range radio link, a long-range radio link, a wired link, or other types of links.

After an IP communication network has been deployed, the operator must be able to determine its performance.

Indeed, there is a gap between the actual performance and theoretical performance of an IP network, the latter for example being defined in specifications. The network's theoretical performance is calculated by adding the individual performance of the network components. But, on one hand, this individual performance is evaluated using simulations and not real tests, and, on the other hand, many distortions affect a component's individual performance when it is integrated into an actual network. In particular, at a node ensuring a change of physical medium between two links, the means that makes it possible to relay an IP datagram introduce delays or errors.

Furthermore, the individual performance of the network's components is evaluated on the transfer of data bits belonging to the header portion of an IP datagram. This is therefore an evaluation of the network's performance at the "lowest" levels of the OSI model, i.e the level 1 layer (physical), the level 2 layer (MAC), and the level 3 layer (network), which are related to the transmission of the signal along the physical medium of the link. However, the operator of the IP communication network tries to characterize the communication in terms of an offer to a user whose terminal is connected to the network. The user uses the network to access the resources needed when applications are run on the user terminal. As a result, the user sees the quality of the communication on the network through the proper execution of these applications. The performance of the IP network must therefore be evaluated at the "highest" levels of the OSI model, i.e. the level 4 layer (transport—TCP or UDP) and the level 5 to 7 layers (application) or application software layers.

Lastly, the network operator wishes to be able to evaluate, and preferably simply in terms of implementation, the performance of the IP communication network at any time during the operation thereof, and in particular when a component is updated, e.g. when switches or routers to the network nodes are replaced.

The invention therefore aims to offset these problems and meet these needs.

To that end, the invention relates to a method for measuring the performance of a network, including the steps comprising:

parameterizing requests, each request pointing to resources that can be accessed, via the network, from a user terminal connected to the network, the parameterized requests being stored in a database;

creating at least one user session by selecting several parameter requests;

running a test campaign comprising:
concatenating in time the emission, from a user terminal, of the various requests in said at least one session; and, for each of the emitted requests,
waiting for a response and calculating the value of at least one typical variable of the received response;
aggregating the various values of said at least one typical variable calculated during the test campaign to determine the value of a communication quality estimator.

According to specific embodiments of the invention, the method comprises one or more of the following features, considered alone or according to all technically possible combinations:

the test campaign consists of running several user sessions in parallel;

the user sessions are run by different user terminals, connected to said network;

during the step for creating a user session, a profile parameter is used as criterion to select certain parameterized requests, the profile parameter defining a particular type of usage behavior of the resources available on the network;

said at least one variable typical of the response is the time separating the emission of a request on the network, from the reception, at the user terminal, of the entire data file corresponding to the resource indicated by the request;

resources accessed during the running of a test campaign are stored on at least one server terminal connected to the network, the status of which is known while said test campaign is being run;

said network supports the IP protocol; and during the running of a test campaign, the position and/or speed of the user terminal are stored during the emission of each of the requests of said at least one session, and said aggregation step takes into account positions and/or instant speeds stored to determine said estimator.

The invention also relates to a measuring system of a network performance estimator supporting the IP protocol, making it possible to carry out the method previously presented, and comprises:

a database means;

a means for parameterizing requests that may be emitted by a user terminal connected to said network to access a resource available on the network, said parameters of the request being stored in the database means;

a means for creating a user session making it possible to select a plurality of requests in the database;

a means for running a test campaign able to emit, successively in time, the various requests of at least one user session and calculating, for each emitted request, the value of the at least one variable typical of the response received by the emitter terminal; and, a means for aggregating the values of said at least one typical value on said test campaign to determine a communication quality estimator.

The invention and its advantages will be better understood upon reading the following description, considered solely as an example, and done in reference to the appended drawings, in which.

The implementation of the measuring method of an IP communication network performance estimator makes it possible to test an existing network, medium for communication between at least one user terminal and at least one server terminal.

Figure 1:
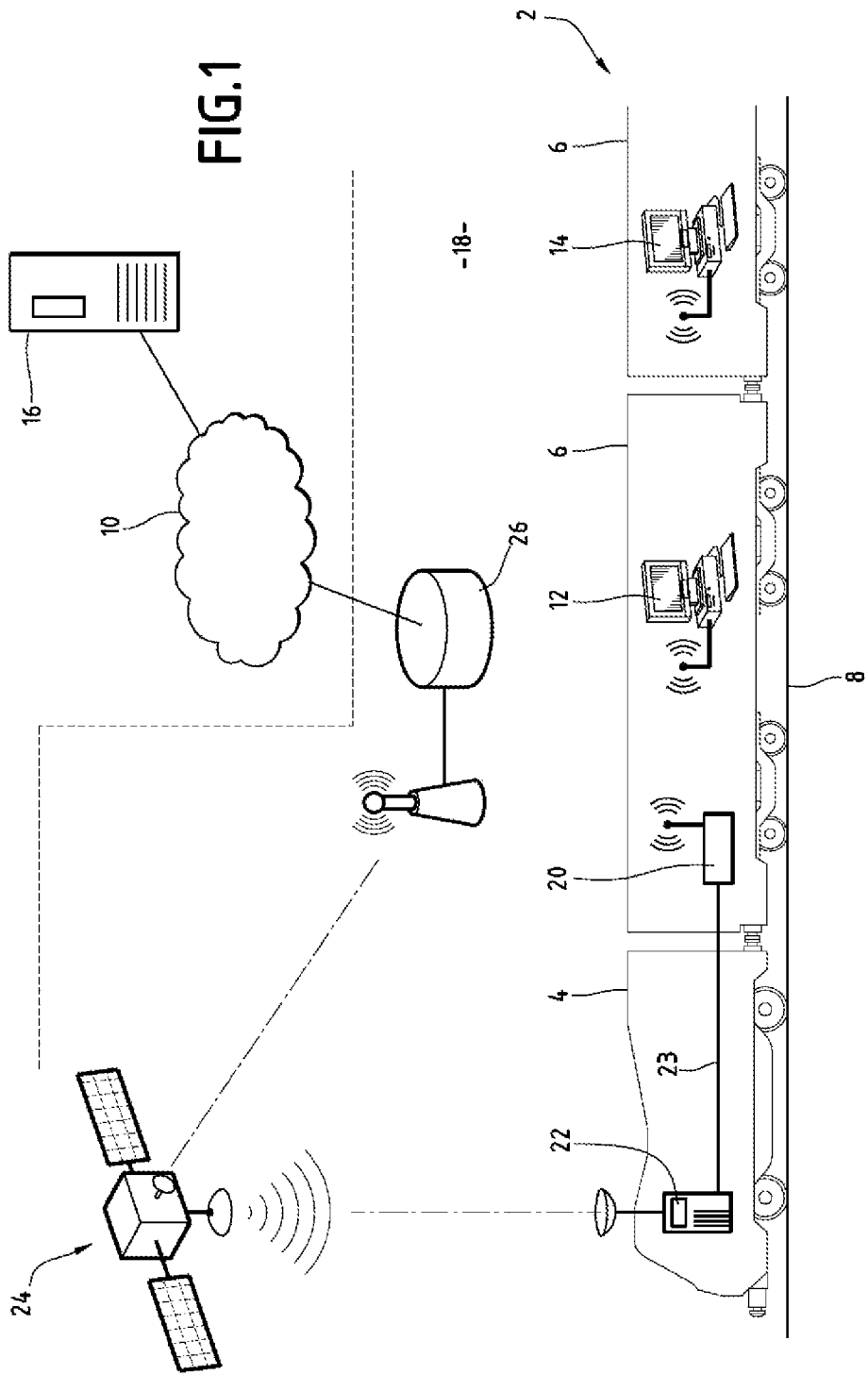
FIG. 1 is a diagrammatic illustration of the architecture for implementing the measuring method of an IP communication network performance estimator.

In reference to the architecture of FIG. 1, a train 2, made up of a locomotive 4 and several cars 6, circulates along a track 8. An internet communication service 10 is offered to the passengers on the train 2. A user uses a user terminal, such as computers 12 and 14, to access various resources, stored on server terminals connected to the Internet 10, such as the server 16.

From the user terminal 12 to the Internet 10 and the server 16, an IP communication network 18 first comprises a wireless connection of the Wi-Fi type, which is established between each user terminal 12, 14 and a local access point 20. The train 2 may be equipped with a plurality of local access points 20, for example a local access point 20 per car 6. The different local access points 20 are connected to each other and to a gateway computer 22 situated in the locomotive 4, through Ethernet connections, for example. Thus, the train 2 is equipped with a local network 23, forming a mobile section of the IP communication network 18. The gateway 22 is equipped with a means making it possible to establish a satellite link with a satellite 24. The satellite 24 is connected with a base station 26, fixed on the ground. The satellite 24 forms a communication relay between the mobile gateway 22 and the stationary base station 26. The base station 26 is an access point to the Internet network 10.

Thus, the IP communication network 18 to be tested is a composite network connecting links having different physical media. This network 18 allows communication between a user terminal onboard a moving train and a server terminal on the ground.

The network operator 18, which provides the train passengers 2 with communication services via the Internet 10, wishes to know the quality of the communication effectively established using the network 18.

Figure 2:
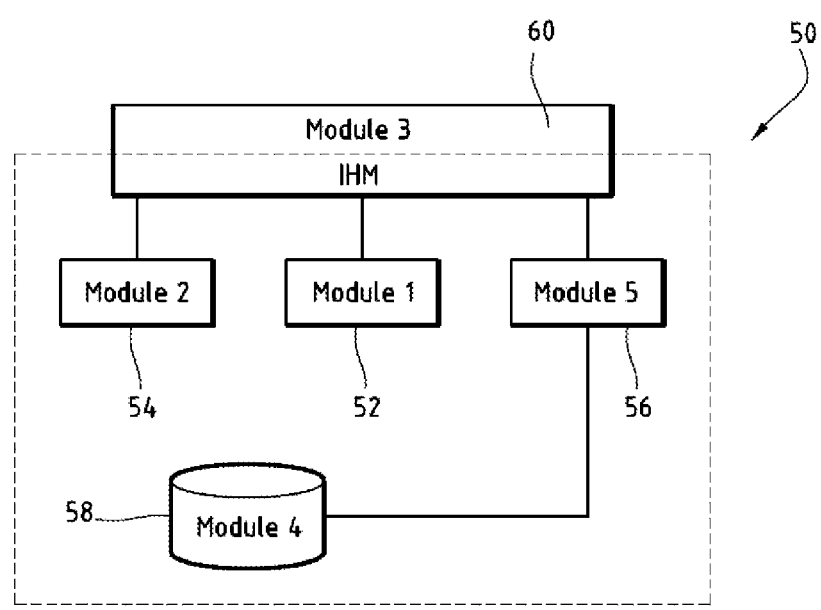
FIG. 2 is a block diagram of a software application that, when run on a user terminal with the architecture of FIG. 1, implements said measuring method.

To that end, a test software application 50, shown diagrammatically in FIG. 2, is run on a computer having technical characteristics similar to those of a user terminal 12, 14. In the following, the computer on which the test software 50 is run is the user terminal 12.

The running of the test software 50 aims to reproduce, as faithfully as possible, at least one and preferably several Internet use sessions by several passengers, while calculating, in real-time, the values of typical variables of the response received following the emission of each of the IP requests making up the sessions.

As a reminder, a request is a pointer towards a resource available on a server terminal connected to the Internet 10 and accessible via the network 18 and the Internet network 10. A request associates a data transfer protocol (HTTP, FTP, etc.), the address of the resource (URL for "Universal Resource Locator"), the name of the data file, the extension of the data file, and possibly other parameters.

The extension of the data file indicates the format of the data present in the file and, as a result, the application adapted to read that file.

As indicated in the first column of table 1, at the end of this description, data files can be transferred according to different protocols. Several protocols can be used during a same test campaign, so as to estimate the quality of the application software layers of the network 18.

The test software 50 includes a plurality of program instructions stored in storage means of the user terminal 12 and able to be run by a processor of the user terminal 12 to carry out the method for measuring the performance of the IP communication network.

The test software 50 includes:

- a module 52, making it possible to parameterize requests, create user sessions, and prepare test campaigns. The module 52 may make it possible to manage a user profile parameter, as will be described below in detail. Lastly, the module 52 ensures the running of a test campaign;
- a module 54, making it possible to manage the different transfer formats and protocols for the resources accessed during a test campaign, and associate each of the formats and/or transfer protocols with one or more variables typical of the communication quality;
- a module 56, making it possible to aggregate and process the results of one or more test campaigns and determine the value of a performance estimator of the tested IP communication network;
- a database module 58, in which the modules 52, 54, and 56 are able to read and write data; and,
- a module 60 constituting a man-machine interface offering the operator conducting the test different screens adapted to running the modules 52, 54 and 56.

Figure 3:
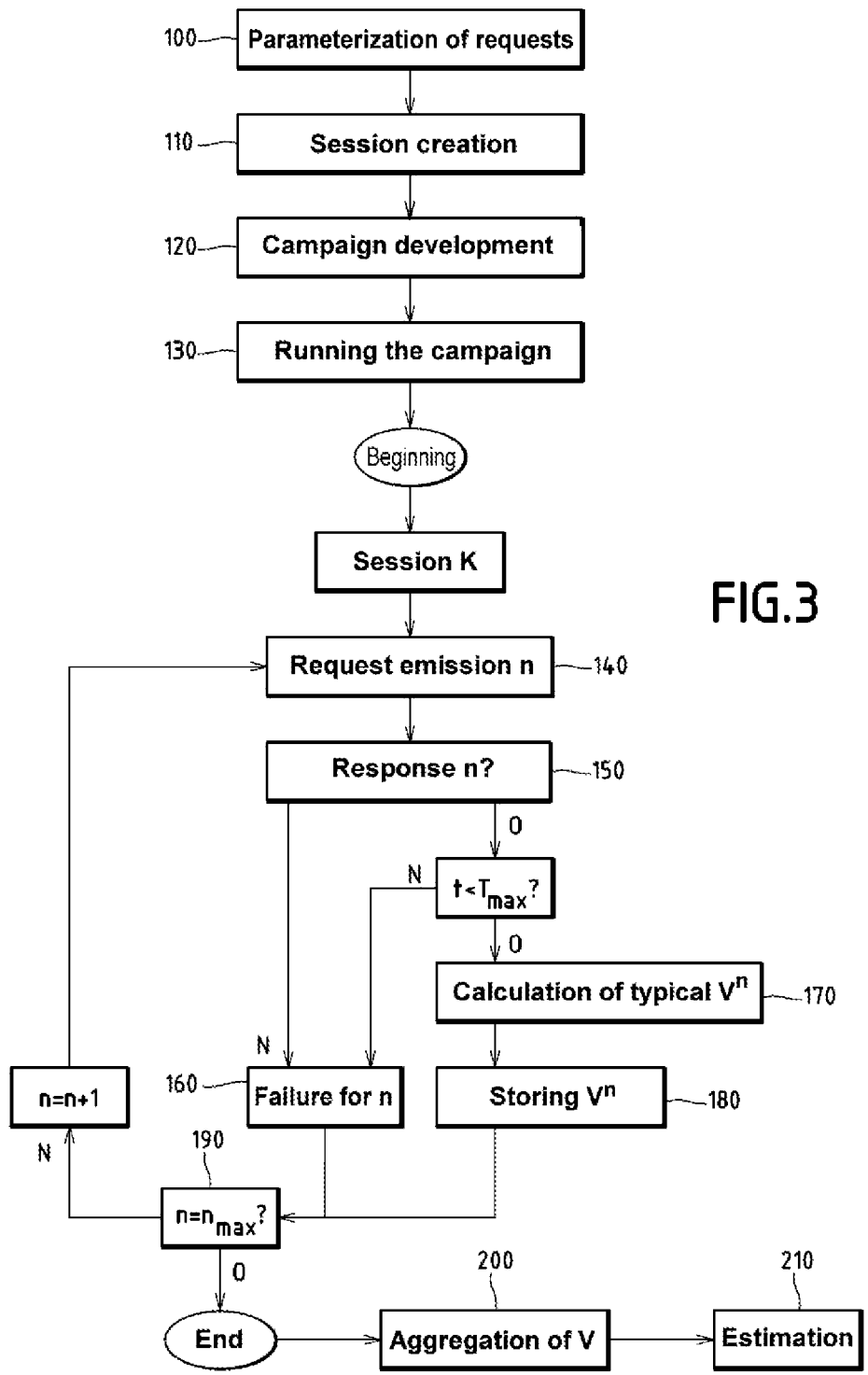
FIG. 3 is an algorithm showing the different steps of said measuring method.

In reference to FIG. 3, the method for measuring IP network performance starts with the development of a test campaign.

The development includes, in step 100, the preparation of a request. In an adapted window, opened on the user terminal 12 screen, the operator captures the necessary parameters for the request to point towards a predetermined available resource, via the network 18 and the Internet 10, for example on the server 16. Once parameterized, the request is saved in a request table in the database 58. The operator develops and thus stores several requests. The request table may also include a column making it possible to associate a request with a duration corresponding to a read time by the user or use time by an application of the data file associated with the considered request.

Then, the development continues, in step 110, through the creation of a user session that corresponds to a group of requests representing a user's real behavior. To create a user session, the operator navigates in the request table of the database 58 and selects some of the stored requests. The identifiers of the selected requests are grouped together in an ordered list, associated with the created user session. The list is ultimately stored in the database 58.

The operator can create a user session in several ways: it can be a random extraction of several requests from the database 58; it can be a user session dedicated to the test of a particular application, in which case the operator selects several requests pointing towards resources having a same format; it can be a session reproducing the Internet navigation behavior of a particular type of user. In the last case, the criterion used to query the request table is a profile parameter representing different types of Internet usage behavior. It is, for example, possible to predefine a "Professional" profile making it possible to extract requests from the database pointing towards resources corresponding to the pages of a stock website application, business resources using a VPN ("Virtual Private Network") connection, and resources corresponding to viewing emails. It is also possible to define a "Recreational" profile for which one selects, in the database 58, requests pointing towards resources associated with music or video files.

After creating one or several user sessions, the operator develops, in step 120, a particular test campaign by selecting, in the database 58, one or several user sessions that will be run in parallel during the test campaign thus prepared.

Then, asynchronously with the preceding steps, in step 130, the operator, using the interface of the module 52, selects, then launches the running of a particular test campaign comprising at least the session K.

The running of the test campaign is expressed through the emission, by the user terminal 12 on the IP network 18, of different requests grouped together in the session K. According to a first alternative embodiment, the requests are emitted in a temporal concatenation that follows the order in which the requests are ordered in the list associated with the session K. According to a second alternative embodiment, when a test campaign is run, the requests are emitted according to a random temporal concatenation relative to the manner in which the requests are ordered in the list associated with the user session.

More precisely, in step 140, a first request is emitted and the user terminal 12 waits (step 150) for the corresponding response. This wait lasts for a wait time that is at most equal to a maximum wait time Tmax. Either the user terminal 12 receives a response in a shorter timer than the maximum wait time Tmax and the measuring method goes through step 170; or the wait time exceeds the maximum wait time Tmax and the user terminal 12 associates the first request with a response of the "Fail" type (step 160).

In step 170, the user terminal 12, having received a response to the emitted request, calculates the value of a variable typical of the reception of data following the emission of a request. As indicated in the second column of table 1, different typical variables can be associated with a service for accessing a resource.

The value of the typical variable calculated for the request in progress is stored in the database 58 in step 180.

Finally, in step 190, irrespective of whether the emission of a first request has led to a failure or to the calculation of a value of a typical variable, the software 50 moves on to the following request in the list of requests for session K, unless the entire list has been run through. In that case, when the set of requests for the session K has been emitted, the test campaign ends.

It will be noted that to come closer to a normal user session, a wait time can be observed between the moment the response to a request is received and the moment the following request is emitted. This wait time is equivalent to the viewing time by the user of the data file for the received response. This wait time can be a parameter participating in the development of the request.

When during a test campaign several user sessions are run in parallel, they are run either from a single user terminal emulating several user terminals having different IP addresses, or from several user terminals connected to each other. In the latter case, the different user terminals used in the measuring campaign are not necessarily connected to each other. They can be independent of each other, on the condition they are synchronized on a same time base. At the end of the test campaign, the results obtained by each of the user terminals are aggregated together, using an aggregation module 56.

At the end of the test campaign, the different values of the variables typical of the responses are processed. This involves aggregating (step 200) the results of the different user sessions and bringing together the values of the variables characterizing the same resource format and/or the same transfer protocol. The processing continues in step 210 to calculate the value of an estimator of the network performance 18. For example, the response times measured for all of the requests pertaining to a resource of the "webpage" type can be the subject of a statistical calculation. The associated estimator is, for example, the average of the response times or the deviation from said average. The operator can, at the end of the processing, graphically display the results using the man-machine interface 60.

In the described embodiment, the method is implemented to estimate the quality of a network having a mobile section. As a result, it is interesting to associate the running of the test campaign with information relative to the positioning and speed of the train 2. This data is obtained by equipping the user terminal 12 with a GPS system (Global Positioning System), so as to determine the instantaneous position and speed of the train 2. When the test campaign is run, measurements of the instantaneous position and speed of the train 2 are done during the emission of a request, then are stored in the database 58 at the same time as the value of the variable typical of the response to that request. The data processing module 56 associates these instantaneous positioning and speed measurements with the calculation by the estimator. The iteration of a test campaign for different positions and/or speeds of the train 2 leads to the calculation of a series of estimators providing information on the impact of the position and speed of the train 2 on the network's performance 18.

For the estimator to best represent the network 18, it is advantageous for the requests to point towards resources provided on a server terminal 16 whereof the state is known all throughout the running of the test campaign. Preferably, the terminal 16 is managed by the operator of the IP network 18.

In the following, examples of metrics associated with a service are presented.

For the HTTP or HTTPS protocol, the typical "response time" variable corresponds to the time separating the moment when the request is emitted on the network 18 and the moment when the complete loading ends, in a memory of the user terminal 12, of the data file associated with the resource indicated by this request.

For the voice on IP (VoIP) service, this may involve a subjective measurement. In that case, the running of the test session is interactive and the user is invited, through an adapted interface, to note the quality of the offered voice on IP service. A MOS (mean opinion score) estimator is then used.

It may also involve an objective measurement. In that case, the calculation of a relevant variable has been defined by the ETSI and is described in appendix E of technical specification ETSI TS 101 329-5V1.1.2 (2002-01). The calculation of the estimator derives from the value of the R-factor described in this technical specification.

For the implementation of this objective test, the server 16 runs an application specific to the voice on IP service, which makes it possible to implement, in particular, the SIP and RTP protocols.

The test of the voice on IP service can be done in the client-server direction, but also in server-client direction on the condition the specific application implementing the SIP protocol is adapted, in order to provide a return path for the static magnitudes calculated by the server, towards the client computer.

In the server-client direction, the server stores, in its storage means, a reference voice file that it sends the client, upon request by the latter, when a test session of the voice on IP service is run.

For the UDP data transfer service, the server 16 runs an auxiliary application making it possible, in collaboration with the test application run on the client computer, to test this service, either in the client-server direction or in the server-client direction.

To test this service, during the phase for creating a session, the user creates an auxiliary file to characterize the UDP service to be tested. This file for example comprises:
the IP address of the target server;
the direction of the data transfer to be tested (server-client or client-server);
the profile of the data to be transmitted (random or fixed);
the size of the useful data to be transmitted (fixed, random, alternating);
the flow rate to be generated; and
the frequency of the exchanges of the calculated static magnitudes.

When a UDP test session is run, in an initial phase thereof, the auxiliary characterization file is read by the client computer. The information contained in this auxiliary characterization file is used either by the client computer test application, or by the auxiliary application run on the server computer.

The characteristic estimators of the UDP protocol that are determined during the test protocol are for example:
The "transit time," which corresponds to the time between the sending of a data packet and the receipt of that packet. The calculation of the transit time requires that the client and the server be perfectly synchronized with each other. This is done by synchronizing the clocks of these two computers by using, for example, satellite positioning means of the GPS type that deliver a time signal.
The "loss rate," which represents the percentage of lost packets. The header of an emitted UDP packet includes a sequence number incremented by one unit upon each emission of a new packet. The loss rate is then easily calculated by the receiver from the number of packets received and the sequence number of the last received packet.
The "jitter," which represents the time difference between the intervals separating two packets during their emission and reception. The jitter is given by the following formula:

$$J=\mathrm{abs}[TR(n)-TR(n-1)-TS(n)+TS(n-1)]$$

where:
abs( ) is the function returning the absolute value,
n is the number of the received packet,
TR( ) is the table of the reception times of the packets, calculated locally by the receiver, and
TS( ) is the table containing the transmission moments of the packets, information placed by the emitter in the header of the packets and extracted by the receiver upon reception of the packet.

In this way, in the client-server direction, the auxiliary test application evaluates these statistical magnitudes, then the transfers towards the client and the main test application. To that end, a TCP connection dedicated to the repatriation of the statistical magnitudes is provided. The server 16 regularly transmits the statistical magnitudes. If P is the frequency of these data transfers, in the case of absence of data for more than two successive periods, 2P, the connection between the server and the client is assumed to have failed and causes the test session of the UDP protocol to be interrupted.

In the server-client direction, the auxiliary file provides the necessary information to the server so that it generates the data traffic required for the UDP protocol test. It is the client that then calculates the statistical magnitudes making it possible to determine the estimators of the UDP service.

Other services can be tested quantitatively:
i) this can for example involve an availability test consisting of the test application run by the computer periodically emitting a "ping" request towards a predetermined machine of the network, and preferably the gateway 22 managed by the network operator.

The network is considered available when the "ping" request is followed by a response in an allotted timeframe, the value of which is configurable.

The "availability rate" estimator is calculated by dividing the number of "ping" requests with a response in the allotted time, by the total number of "ping" requests emitted. The availability estimated is displayed in real time on the man-machine interface of the client computer, and delayed as a complement to a metric as previously presented.

The initial phase of creating a session including an availability test includes the creation of an auxiliary file grouping together the information needed to carry out the test. This auxiliary file includes the following parameters:
the target machine for the "ping" request;
the time between two successive requests;
the time allotted for the response;
the sampling period to calculate the availability rate (evaluation over one hour, for example).

ii) This can also involve a compression test. Certain segments of the network to be tested transfer data while compressing it. This is in particular the case when the data passes through a satellite. The compression test makes it possible to show the capacity of a compressed data transfer, either upstream (client-server direction) or downstream (server-client direction).

The compression estimator, which can be evaluated several times during a same session, is for example obtained by comparing the transfer time of a reference file in compressed form relative to the transfer time of that same uncompressed file.

iii) This can also for example involve a response time test. This test is similar to the availability test with the exception that the request is not a simple "ping" request, but an ICMP request. After the emission of an ICMP request, the response must be received within an allotted and configurable time. If no response is received in the allotted time, a trace is recorded in a "log" file.

Alternatively, a "Log" file of the gateway computer 22 is used for the configuration steps of the requests and creation of the sessions. As a reminder, a Log file is a text file grouping together all of the requests reemitted by the gateway computer 22 from the local network 23 towards the network 18. In the "log" file, each request is dated. Using this Log file, the sessions of N real users are recorded during a first movement of the train along a path. The test campaign will consist of reemitting the requests from a Log file, respecting the chronology of the Log file, so as to reproduce the N prior user sessions during a new movement of the train along the same path.

Although the preceding description was done in relation to a network supporting the TCP-IP protocol, other protocols respecting the ISO-OSI ("Open System Interconnection") standard can be tested using the same method.

The measuring system according to the invention was described in the context of its use in a train, but it makes it possible to perform measurement campaigns on any node, stationary or mobile, of any network.

Thus, the implementation of the invention makes it possible to measure the performance of an existing real network, from the perspective of the user whose terminal runs an application that accesses a particular resource.

TABLE I

| | |
|---|---|
| FTP GET | 1-Failure rate |
| | 2-Downstream rate |
| | 3-Transfer Time |
| FTP PUT | 1-Failure rate |
| | 2-Downstream rate |
| | 3-Transfer Time |
| EMAIL SMTP | 1-Failure rate |
| | 2-Response time |
| EMAIL POP | 1-Failure rate |
| | 2-Response time |
| HTTP and HTTPS | 1-Failure rate |
| | 2-Response time |
| IM | 1-Failure rate |
| Peer to Peer | 1-Failure rate |
| VoIP (Single-user) | 1-Failure rate |
| | 2-MOS (audio) |
| VoIP (Multi-user) | 1-Failure rate |
| | 2-MOS (audio) Local |
| | 3-MOS (audio) Remote |
| Streaming | 1-Failure rate |
| | 2-MOS (audio) |
| | 3-MOS (video) |
| | 4-MOS (overall) |
| UDP (client-server) | 1-Transit time |
| | 2-Loss rate |
| | 3-Jitter |
| UDP (client-server) | 1-Transit time |
| | 2-Loss rate |
| | 3-Jitter |

The invention claimed is:

1. A method for measuring the performance of a network, the steps of the method comprising:
   parameterizing a plurality of requests, each request pointing to resources that can be accessed, via the network, the parameterized requests being stored in a database;
   creating at least one user session by selecting several parameter requests;
   running a test campaign comprising:
      chaining in time an emission, from a user terminal, of the various requests in the at least one session; and, for each of the emissions,
      calculating the value of at least one typical variable of a received response;
   aggregating the various values of the at least one typical variable calculated during the test campaign to determine the value of a communication quality estimator.

2. The method according to claim 1, the test campaign consisting of running several user sessions in parallel.

3. The method according to claim 2, the user sessions being run by different user terminals, connected to the network.

4. The method according to claim 1, wherein during the step for creating a user session, a profile parameter is used as criterion to select certain parameterized requests, the profile parameter defining a particular type of usage behavior of the resources available on the network.

5. The method according to claim 1, the at least one variable typical of the network performance is calculated based on the reception, by the user terminal, of the entire data file corresponding to the resource indicated by the request emitted by the user terminal.

6. The method according to claim 1, wherein the resources accessed during the running of a test campaign are stored on at least one server terminal connected to the network, the status of which is known while the test campaign is being run.

7. The method according to claim 6, the server whereof the status is known runs an auxiliary application making it possible to calculate, at the server terminal, the value of at least one variable typical of the network's performance, the latter being calculated based on the reception, by the server terminal, of the request emitted by the user terminal.

8. The method according to claim 1, the network supports the IP protocol.

9. The method according to claim 1, a request includes a parameter corresponding to the data transfer service to be used to transfer the data file corresponding to the resource mentioned in a request.

10. The method according to claim 1, during the running of a test campaign, the position and/or speed of the user terminal are stored during the emission of each of the requests of the at least one session, and in that the aggregation step takes into account positions and/or instant speeds stored to determine the estimator.

11. A measuring system of a network performance estimator, it makes it possible to carry out the method according to claim 1, and in that it comprises:
   a database means;
   a means for parameterizing requests that may be emitted by a user terminal connected to the network to access a resource available on the network, the parameters of the request being stored in the database means;
   a means for creating a user session making it possible to select a plurality of requests in the database;
   a means for running a test campaign able to emit, successively in time, the various requests of at least one user session;
   a means for calculating the value of at least one variable typical of the response received by the emitter terminal; and,
   a means for aggregating the values of the at least one typical value on the test campaign to determine a network performance estimator.

* * * * *

UNITED STATES PATENT AND TRADEMARK OFFICE
CERTIFICATE OF CORRECTION

PATENT NO. : 8,499,076 B2  Page 1 of 1
APPLICATION NO. : 13/130784
DATED : July 30, 2013
INVENTOR(S) : Frédérique Poivert-Becq It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this

Fifteenth Day of September, 2015

Michelle K. Lee
*Director of the United States Patent and Trademark Office*